Patented July 19, 1927.

1,636,229

UNITED STATES PATENT OFFICE.

WILHELM HIRSCHKIND, OF ANTIOCH, CALIFORNIA, ASSIGNOR TO GREAT WESTERN ELECTRO CHEMICAL COMPANY, OF SAN FRANCISCO, CALIFORNIA, A CORPORATION OF CALIFORNIA.

MANUFACTURE OF ALKALI METAL XANTHATES.

No Drawing. Application filed November 3, 1925. Serial No. 66,686.

This invention relates broadly to a method for the manufacture of alkali metal xanthates, and its object is to produce such materials with maximum yield with a minimum of impurities, and to increase the temperature range over which the reactions may be carried out commercially. More especially the process relates to the production of sodium xanthate, which has heretofore been exceedingly difficult, if not impossible to produce commercially.

Various methods have been suggested for producing alkali metal xanthates, one of such methods being set out in United States Patent No. 1,507,089. Such method comprises reacting a mixture of carbon bisulphide, alcohol, and an alkali metal hydroxide, the reaction being strongly exothermic.

It has been found that when the above action takes place with either potassium or sodium hydroxide, that the temperature should not exceed 30 degrees C., for if it does, there are certain side reactions taking place with the production of thiocarbonates and sulphides, which will contaminate the product and reduce its value for several reasons. Not only is the presence of these impurities undesirable from the standpoint of the utility of the product, but their formation inevitably lowers the yield of true xanthate products from raw materials used, and the product is far less stable.

At a temperature below 25 degrees C., the above mentioned side reactions are minimized, and a more stable xanthate is produced. In the manufacture of potassium xanthate, it has been found that no considerable quantity of sulphides are produced at a temperature of 20 degrees C., the reaction being confined largely to the production of true xanthate, but at lower temperatures the action is slowed materially.

With the use of sodium hydroxide, it has been found that if a temperature as low as 25 degrees C. is used, the formation of xanthate is practically stopped, the component chemicals simply remaining in mechanical mixture without reacting one on another. Because of the conditions stated above, the manufacture of sodium xanthate free from sulphides, is particularly difficult, and especially so in large batches, where close temperature control of the mass is not so easily effected as in a small batch.

I have ascertained that by adding a small percentage of any one of several chlorinated hydrocarbons in a catalytic amount to the reacting mass consisting of carbon bisulphide, alcohol, and an alkali metal hydroxide (as sodium or potassium hydroxide) that the reaction can be made to go on readily and completely at a temperature as low as 10 degrees centigrade. The presence of a chlorinated hydrocarbon in the reacting mass in a catalytic amount prevents the side reactions from taking place during the reaction and also enables such reaction to take place at temperatures below 30 degrees centigrade. Such a catalyst makes it possible to produce an alkali metal xanthate substantially, if not entirely free from thiocarbonates and other undesirable sulphides, and in larger quantities than has heretofore been obtainable in the processes as now practiced.

My experimental work shows that carbon tetrachloride, trichlorethylene, tetrochlorethane and dichlorbenzol all have the proper catalytic effect in this reaction, though some are more effective than others, and all of them give a wider temperature range for the reaction, both with the sodium and with the potassium hydroxide.

In carrying out this reaction I follow any one of the several processes set out in Patent No. 1,507,089 with the addition to the reaction mass of a catalytic amount of a chlorinated hydrocarbon such as referred to above, the reaction mass being maintained below a temperature of 30 degrees centigrade. Thus to a mixture of alcohol, carbon bisulphide and an alkali metal hydroxide is added a small percentage of dichlorbenzol, the reaction mass being maintained at a temperature of about 10 degrees centigrade.

The reaction proceeds smoothly and rapidly with the consequent formation of the xanthate salt of an alkali metal in a substantially pure state.

Having thus described my invention, what I desire to secure by Letters Patent of the United States is as follows, but modifications of the process may be made within the purview of the annexed claims:

1. A process for producing alkali metal xanthates which comprises reacting alcohol, carbon bisulphide, and an alkali metal hydroxide in the presence of a chlorinated hydrocarbon in a catalytic amount.

2. A process for producing alkali metal xanthates which comprises reacting alcohol, carbon bisulphide, and an alkali metal hydroxide in the presence of a chlorinated hydrocarbon in a catalytic amount at a temperature lower than 30 degrees centigrade.

3. A process of manufacturing alkali metal xanthate which consists in bringing alcohol, carbon bisulphide, and an alkali metal hydroxide together in the presence of a chlorinated hydrocarbon in a catalytic amount and maintaining the mass at a temperature below 30 degrees C.

4. The process of producing alkali metal xanthates which comprises reacting alcohol, carbon bisulphide, and an alkali metal hydroxide together in the presence of dichlorbenzol.

5. The process of producing alkali metal xanthates which comprises reacting alcohol, carbon bisulphide, and an alkali metal hydroxide together in the presence of dichlorbenzol, and maintaining the mass at a temperature below 30 degrees centigrade.

6. The process of making sodium xanthate which consists in adding to the reacting mass consisting of alcohol, carbon bisulphide, and sodium hydroxide, dichlorbenzol in a catalytic amount.

7. The process of producing alkali metal xanthates which comprises reacting alcohol, carbon bisulphide, and an alkali metal hydroxide together in the presence of dichlorbenzol in a catalytic amount, and maintaining the mass at a temperature of about 10 degrees centigrade.

In testimony whereof I have hereunto set my hand this 17th day of October A. D. 1925.

WILHELM HIRSCHKIND.